(12) United States Patent
Hemeryck

(10) Patent No.: US 6,409,605 B1
(45) Date of Patent: Jun. 25, 2002

(54) HUB FOR PRELIMINARY SHOCK ABSORBER IN PARTICULAR FOR MOTOR VEHICLE, AND TORQUE DAMPING DEVICE COMPRISING SAME

(75) Inventor: Bruno Hemeryck, Belleuse (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/171,168

(22) PCT Filed: Feb. 14, 1997

(86) PCT No.: PCT/FR98/00281

§ 371 Date: May 27, 1999

§ 102(e) Date: May 27, 1999

(87) PCT Pub. No.: WO98/36188

PCT Pub. Date: Aug. 20, 1998

(30) Foreign Application Priority Data

Feb. 14, 1997 (FR) .............................. 97 01857

(51) Int. Cl.$^7$ .............................. F16D 47/02; F16D 3/12
(52) U.S. Cl. ...................... 464/68; 192/213.2
(58) Field of Search .............................. 464/45, 48, 98, 464/68, 185; 192/205, 213.2; 474/902; 74/440, 434

(56) References Cited

U.S. PATENT DOCUMENTS

| 2,521,138 | A | * | 9/1950 | Waller | 464/68 |
| 3,129,570 | A | * | 4/1964 | Ludwig | 464/68 |
| 3,428,155 | A | * | 2/1969 | Binder et al. | 464/68 |
| 3,556,273 | A | * | 1/1971 | Maucher | 192/106.2 |
| 4,352,420 | A | * | 10/1982 | Maycock | 464/68 |
| 4,418,812 | A | * | 12/1983 | Lech, Jr. | 192/106.2 |
| 4,645,054 | A | * | 2/1987 | Raab | 464/68 |
| 5,251,736 | A | | 10/1993 | Jeppe et al. | |
| 5,355,984 | A | * | 10/1994 | Grabis | 192/70.17 |
| 5,366,057 | A | * | 11/1994 | Despres et al. | 192/106.2 |
| 5,468,189 | A | * | 11/1995 | Putman | 464/68 |
| 5,908,099 | A | * | 6/1999 | Kleifges | 192/214.1 |
| 5,936,497 | A | * | 8/1999 | Vilou | 335/126 |
| 6,083,107 | A | * | 7/2000 | Herbst | 464/64 |
| 6,089,983 | A | * | 7/2000 | Lebas et al. | 464/68 |
| 6,179,715 | B1 | * | 1/2001 | Graton et al. | 464/68 |

FOREIGN PATENT DOCUMENTS

| DE | 44 30 262 | 2/1996 |
| DE | 19526051 | 8/1996 |
| EP | 0 546 557 | 12/1992 |
| FR | 2 693 778 | 1/1994 |
| FR | 2 726 341 | 5/1996 |

* cited by examiner

Primary Examiner—Lynne H. Browne
Assistant Examiner—Kenn Thompson
(74) Attorney, Agent, or Firm—Liniak, Berenato, Longacre & White

(57) ABSTRACT

A hub for a predamper having two distinct coaxial parts one of which an external flange, and an internal sleeve axially longer than the external flange.

16 Claims, 3 Drawing Sheets

Fig. 1
Prior Art
Fig. 2
Prior Art
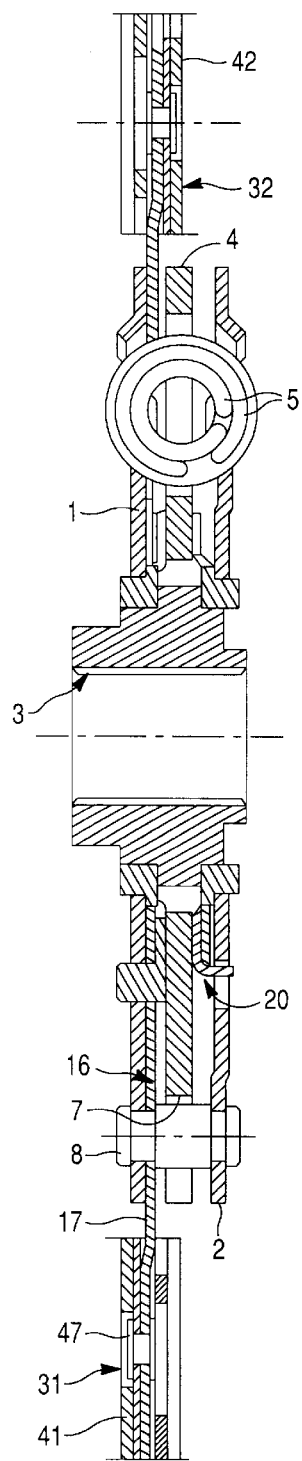
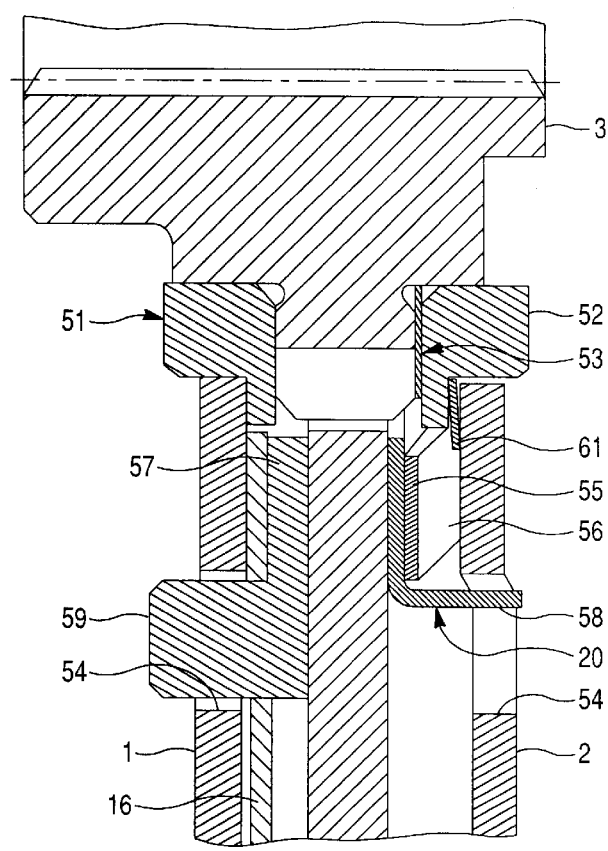

HUB FOR PRELIMINARY SHOCK ABSORBER IN PARTICULAR FOR MOTOR VEHICLE, AND TORQUE DAMPING DEVICE COMPRISING SAME

BACKGROUND OF THE INVENTION

1. Field of the Invention

The present invention relates to hubs for torsion damping devices comprising a predamper, especially for motor vehicles It also relates to torsion damping devices equipped with the said hub, described for example in the document FR-A-2 693 778 (U.S. Pat. No. 5,601,173) to which reference may be made for further details.

2. Description of the Related Art

As is known (FIGS. 1 to 3), such a hub 3 constitutes the output element of the torsion damping device. The hub 3 is surrounded by two guide rings 1, 2 which are disposed on either side of a damper plate 4, which also surrounds the hub 3 but with circumferential loose coupling means 60 interposed, the latter comprising a denture, that is to say alternate teeth and recesses, which are conventionally of trapezoidal form and which are formed at the outer periphery of the hub 3, together with a denture consisting of alternate teeth and recesses, which are conventionally of trapezoidal form and are formed at the inner periphery of the damper plate 4. The teeth of the damper plate 4 penetrate, with a clearance, into the recesses of the hub 3 and vice versa. The hub 3 is splined internally for coupling it in rotation with a first shaft.

The guide rings 1, 2 are joined together through spacers 8 which extend with a circumferential clearance through notches 7 formed at the outer periphery of the damper plate 4. The spacers 8 may take another form, and may consist of axial lugs projecting from one of the guide rings and fixed to the other guide ring, for example by seaming.

The guide rings 1, 2 are fixed to the input element 16 of the said damping device. This input element 16 is fixed for example to a reaction plate which is mounted on a second shaft, for rotation with the latter, either directly or, in this example indirectly through friction liners 31, 32 which are divided into pads 41, 42 fixed by rivets 47 on blades 17 which extend outwardly the input element 16 which is in the form of a disc. The liners 31, 32 may of course be of endless form. In the case of an application to a motor vehicle, the first shaft is typically the input shaft of the gearbox and the second shaft the crankshaft of the engine, the liners 31, 32 being arranged to be gripped releasably between the pressure and reaction plates of a clutch. For this reason the hub must be able to slide axially along the first shaft.

The torsion damping device in this example comprises an input element 16 which is coupled elastically to the output element 3 (i.e. the hub) through a main damper including guide rings 1, 2 and the damper plate 4, together with a predamper which includes the damper plate 4 and the hub 3 (i.e. the output element).

Circumferentially acting resilient means 5, 9, which in this example consist of coil springs, together with axially acting friction means 20, are interposed operatively between the guide rings 1, 2 and the hub 3.

The springs 5 are mounted in windows (not given a reference numeral in FIG. 1) which are formed in facing relationship with each other in the rings 1, 2 and the damper plate 4.

These springs 5 are part of the main damper and are stiffer than the springs 9 which are part of the predamper. These springs 9 are mounted in open slots 91, 92 formed in facing relationship, respectively, at the inner periphery of the damper plate 4 and at the outer periphery of the hub 3.

The slots, which are of generally swallowtail form, and the springs 9 bear on the circumferential edges of the slots through interposed inserts 90, the dorsal face of which is of dihedral form in order to cooperate with the said edges, defining a point when the damper plate 4 and the hub 3 are in the rest state. The front faces of the inserts 90, which are preferably of plastics material in order to reduce noise, carry retaining and centring spigots each of which is engaged in a spring 9 of the predamper.

The friction means 20 comprise a resilient ring 56, which in this example is a corrugated ring, which bears on the guide ring 2 and on an application ring 55 in contact with the damper plate 4, so as to grip a friction ring 57 by reaction between the damper plate 4 and the disc 16 which is backed on the damper plate 1. The rings 55 to 57 are part of the main damper and act during relative rotating movement between the damper plate 4 and the guide rings 1, 2. This movement is only produced when the damper plate 4 comes into engagement with the hub 3 after the circumferential clearance of the loose coupling means 60 has been taken up, because the springs 5 are stiffer than the springs 9 of the predamper. Shocks therefore occur as the clearance in the loose coupling means 60 is being taken up.

The application ring 55 and the friction ring 57 are coupled in rotation respectively to the guide ring 2 and the guide ring 1. For this purpose, each of the rings 1, 2, which in this example are identical, has holes 54 through which there pass lugs 58 and spigots 59 which project respectively from the application ring 55 and the friction ring 57, so as to obtain the said coupling in rotation. Each spigot 59 does of course extend through an aperture in the disc 16.

A centring bearing 51 is interposed between the outer periphery of the hub 3 and the inner periphery of the guide ring 1. A resilient ring 61, which in this example is a Belleville ring, a friction ring 52 and a metallic insert ring 53 are interposed between the outer periphery of the hub 3 and the inner periphery of the guide ring 2.

The bearing 51 and the ring 52 have an L-shaped cross section and include thickened portions, each of which is engaged in the known way in a notch formed in the inner periphery of the guide ring 1, 2 concerned, so as to couple the bearing 51 and the ring 52 respectively in rotation with the guide ring 1 and the guide ring 2.

The components 51 to 53 and 61 are located radially inwardly of the rings 55 to 57 of the main damper. These components 51 to 53 and 61 act permanently during relative motion between the input element 16 and the output element 3. The spring 61 has a lower stiffness than the spring 56. The spring 61 has a stiffness such that it does not overcome the action of the low stiffness springs 9.

The notches housing the springs 9 interrupt the dentures of the loose coupling means 60 with their circumferential clearance. The hub 3 has at its outer periphery a shouldered flange in which the denture of the hub 3 is formed.

The torsion damping device operates in the following way during relative movement between the input element 16 and the output element 3:

in a first step, since the springs 5 are stiffer than the springs 9, the predamper operates by itself so as to absorb the vibrations in the slow running mode of the engine, so that the springs 9 are compressed with relative movement firstly of the damper plate 4 with respect to the hub 3, and secondly of the bearing 51 and the ring 52 with respect to the hub 3; this movement is continued until the teeth of the damper plate 4 come into engagement with the teeth of the hub 3;

in a second step, the damper plate 4 is coupled to the hub 3 for rotation together because the clearance in the loose coupling means 60 has been taken up, and relative movement occurs between the guide rings 1, 2, the damper plate 4 against the action exerted by the springs 5 and the rings 55 to 57; this movement is continued until the spacers 8 come into abutment against the edges of the slots 7, or until interlocking occurs between the turns of the stepped action springs 5 which in this example are disposed in pairs in the windows of the damper plate 4 and guide rings 1, 2.

When the friction liners 31, 32 are released, the hub 3 slides axially along the splines of the driven shaft by virtue of its rotary coupling splines.

Thus the hub 3 must be sufficiently strong at its outer periphery to be able to cooperate with the damper plate 4, which is a hardened component for housing the springs 5. At its inner periphery the hub 3 must have good sliding properties. These two requirements lead to a compromise as regards the choice of material for the hub 3. This is even more so to the extent that the hub 3 undergoes shocks when the teeth of the damper plate 4 come into engagement with the teeth of the hub 3.

The choice of the material therefore depends on the resulting work hardening effects.

In addition, for a given external denture the hub may have different forms, which does not enable manufacture to take place in long production runs.

In this connection, the thickness of the hub is a function of the application, and in particular of the outer diameter of the shaft with which the hub cooperates. The axial position of the flange of the hub depends also on the application.

An object of the present invention is to standardise the hub as far as possible in a simple and inexpensive way, without any limitation as to the choice of material for the hub.

SUMMARY OF THE INVENTION

The Invention

According to the invention, a hub of the type described above is characterised in that it comprises two distinct and concentric coaxial parts, namely an external flange having the denture of the loose coupling means and an internal sleeve having the internal rotary coupling splines, in that the flange has a tubular form at its inner periphery, being shorter in the axial direction than the internal sleeve, and in that the inner periphery of the external flange is fitted around the outer periphery of the internal sleeve, with axial stop means being interposed for preventing any axial sliding movement of the external flange with respect to the internal sleeve.

According to the invention, a torsion damping device is characterised in that it is equipped with such a hub.

Thanks to the invention, the flange or outer body and the internal sleeve may be of different hardnesses matched to their function.

Thus the sleeve can be of a material having good sliding properties, while the outer flange can be of a material having the desired hardness.

Since the sleeve is longer in the axial direction than the flange, it is possible to position the flange axially with respect to the sleeve according to the application, that is to say to regulate its axial offset.

The external flange is thus a standard—identical—component according to the type of predamper, while the internal sleeve is an adaptor and support member the thickness of which varies according to the application as do its splines. In this case the length of the sleeve is constant, that is to say it is standard.

The invention enables production runs of the flange to be extended.

It will be appreciated that the sleeve is a simple and inexpensive component. Due to its standardisation the flange is also less expensive. It also enables the denture of the damper plate of the torsion damping device to be standardised. The form of the flange does of course depend on the type of predamper used.

The flange and the sleeve can be made from sintered material, which thus enables all sharp edges to be avoided. The flange may be force-fitted on the sleeve, or adhesively bonded or welded on the latter. In another version it may be formed by superimposed moulding.

The following description illustrates the invention with reference to the attached drawings, in which:

BRIEF DESCRIPTION OF THE DRAWINGS

FIG. 1 is a half view in axial cross section of a torsion damping device of the prior art;

FIG. 2 is a view on a larger scale showing part of the lower part of FIG. 1;

DETAILED DESCRIPTION OF THE PREFERRED EMBODIMENT

Figure 3:
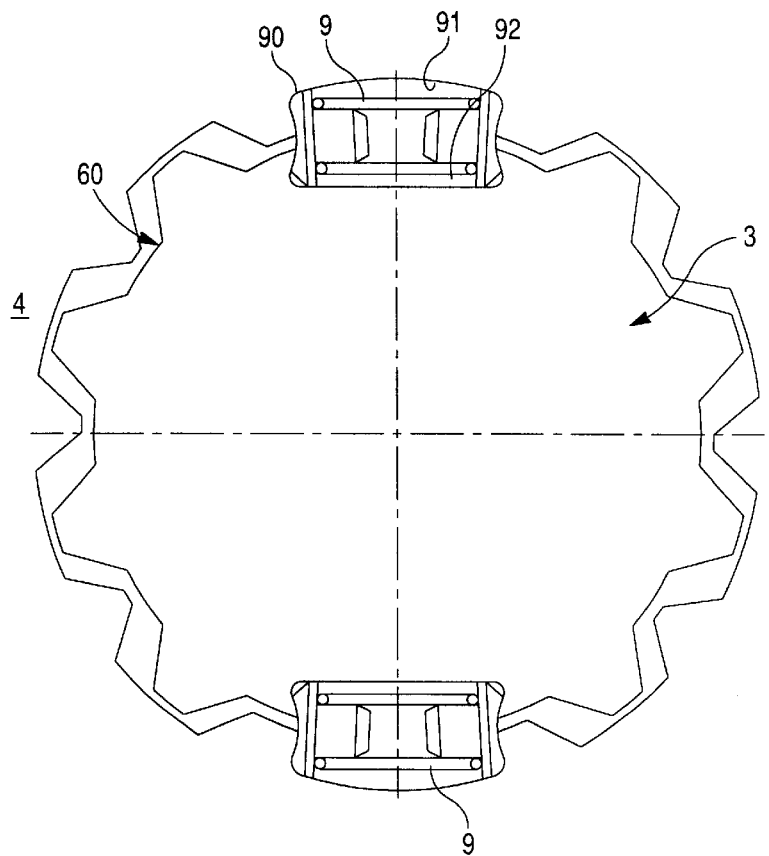
FIG. 3 is a diagrammatic view of the loose coupling means which are interposed between the damper plate and the hub of FIG. 1.

The hub 30 in FIGS. 4 to 8 is of metal and is designed to replace the hub 3 of FIGS. 1 to 3.

The hub 30 is therefore part of the predamper of the torsion damping device. This hub 30 includes in its inside an internal spline 40 for coupling it in rotation, in the way mentioned above, to the first shaft such as the input shaft of the gearbox.

At its outer periphery the hub 30 has, projecting radially outwards, an external flange 43 which is formed with a denture comprising teeth 44 and recesses 45, and being part of the circumferentially-loose coupling means indicated at 60 in FIG. 3.

The denture 44, 45 is interrupted by notches 46 of the same form as those in FIG. 3.

The hub 30 thus has two diametrically opposed notches 46 which are generally of swallowtail form, open towards the outside, together with eight teeth 44 as in FIG. 3, of trapezoidal form and separated from each other by recesses 45 which are wider in the circumferential direction. The teeth 44 are arranged to come into engagement with the teeth of the denture of the damper plate 4 of FIGS. 1 to 3 after a circumferential clearance has been taken up. The denture of the damper plate 4 is preferably of the standard type.

The same is true for the denture of the flange 43 of the hub 30 in accordance with one feature of the invention.

In accordance with another feature of the invention, the rotary coupling splines 40 have a different hardness from that of the flange 43, being of material having different properties.

More precisely, the hub 30 is in two distinct coaxial and concentric parts, namely an outer part 43 surrounding an inner part 48. The inner part 48 constitutes an adaptor member, and in this example it is in the form of an internal sleeve having an axial length which is standard, that is to say it is constant. In this example, these two parts 43, 48 are of metal.

The internal sleeve 48 has internal rotary coupling splines 40, and serves to support the outer part 43 consisting of the flange 43.

It can be seen (FIGS. 7 and 8) that the thickness of the sleeve varies according to the dimensioning of its splines 40.

Figure 7:
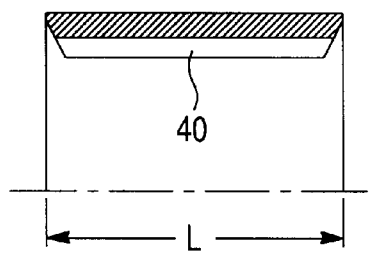
FIGS. 7 and 8 are half views of the sleeve of FIG. 4, in cross sections which are taken respectively through the maximum and minimum dimensions of its splines.
Figure 8:
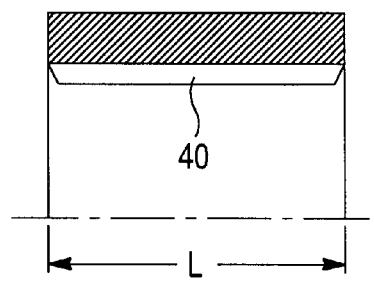

In FIG. 7 the sleeve 48 is mounted on a first shaft of large diameter, while in FIG. 8 it is mounted on a first shaft of small diameter.

The dimension of the sleeve 48, which is a simple and inexpensive component, may vary between two extreme values, the axial length L of the sleeve 48 remaining the same in this example. This sleeve 48 is longer in the axial direction than the flange 43 or outer body.

The external flange 43 has at its inner periphery 49 a tubular form which is longer in the axial direction than the denture 44, 45. It is accordingly formed with shoulders 71, 72 laterally at the level of the denture 44, 45.

The shoulder 71 serves as an abutment face to the ring 53 of FIG. 2, while the shoulder 72 serves as an abutment face for the bearing 51 of FIG. 1.

In that case, the bearing 51 is of frusto-conical form because the internal portion of the shoulder 72 is radially inward of the base of the frusto-conical recesses 45 of the denture 44, 45.

It will be noted that the tubular inner periphery 49 of the sleeve 48, referred to as the tubular portion 49, defines the base of the notches 46 in which are housed the springs of the predamper, which, instead of being coil springs, may in a known way consist of elastic blocks, of elastomeric material for example. The tubular portion 49 is longer in the axial direction than the remainder of the flange 43, its axial length being shorter than that of the sleeve 48.

The notches 46 are deeper than the recesses 45 of the denture 44, 45.

The tubular portion 49 is fitted by its inner periphery over the outer periphery of the internal sleeve 48, being therefore in intimate contact with the said sleeve 48.

The flange 43 is therefore easily positioned with respect to the sleeve 48 by virtue of the tubular portion 49.

Figure 4:
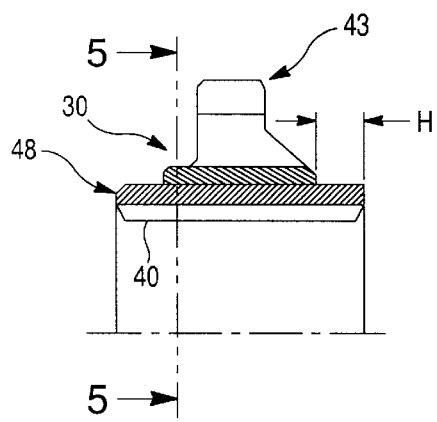
FIG. 4 is a view in axial cross section of the hub according to the invention.
Figure 5:
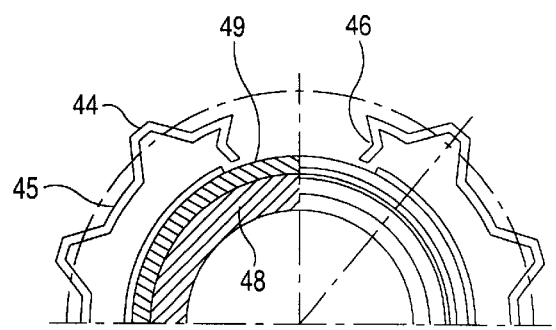
FIG. 5 is a view in cross section taken on the line 5—5 in FIG. 4.
Figure 6:
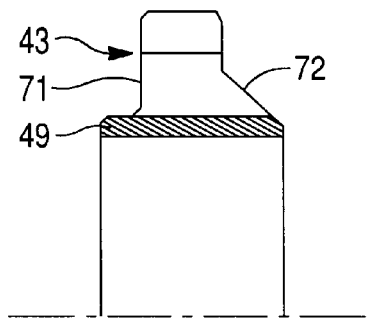
FIG. 6 is a half view in axial cross section of the external flange or outer body of FIG. 4.

FIG. 4 shows at H the distance, which is variable axially according to the application, between the axial ends concerned of the sleeve 48 and of the tubular internal portion 49 of the flange 43, which is therefore identical for all applications, that is to say it is standard.

Fitting of the tubular portion 49 over the sleeve 48 may be obtained by force-fitting so that axial stop means act between the external flange 43 and the internal sleeve 48 so as to avoid any axial sliding movement of the flange 43 with respect to the sleeve 48.

In another version, these axial stop means may consist of an element formed by superimposed moulding, or a weld, which is for example in the form of two weld bands located at the axial ends of the tubular portion 49.

In another version, the axial stop means may consist of an adhesive bond. These various embodiments may be combined.

As will have been understood, the flange 49 may be harder than the sleeve 48, in a material having good sliding properties.

The sleeve 48 and the flange 43 may be of sintered material having the required properties, in such a way that the components do not have any sharp edges and are easy to make.

The flange 43 may easily be obtained regardless of its form. It is less expensive than that in FIGS. 1 to 3 because it is a standard component, that is to say its form is identical for any given type of predamper.

The present invention is of course not limited to the embodiment described. In particular, the metallic flange 43 may be obtained by forging or machining. The sleeve 48 is not necessarily of metal, but may be of plastics material which is reinforced for example by fibres. In all cases the sleeve 48 has to transmit the torque, and the axial stop means are so chosen as also to transmit the torque, and this is why they consist in this example of force-fitting, adhesive bonding or welding or superimposed moulding.

It is of course possible to combine force-fitting with welding and/or adhesive bonding. The axial stop means therefore constitute means for preventing rotation of the sleeve 48 with respect to the flange 43.

The tubular portion 49 of the flange is long enough to enable a secondary damper plate of the predamper to be mounted and secured on it in the manner described in the document FR-A-2 726 341.

In that case, the low stiffness springs are fitted axially between the damper plate 4 and one of the guide rings 1, 2.

Thus the flange does not necessarily include notches for receiving the low stiffness springs. This flange is standard for each type of predamper.

It is of course possible to deposit a nickel layer in the zone of the splines 40 of the sleeve 48, in order to avoid wear and the formation of rust which would lead to a risk of jamming. The deposit may be made after the splines 40 have been formed by broaching, and may consist of chemical deposition consisting of chemical metallisation.

In the same way a layer of nickel may be deposited on the denture of the flange. The hardness of this layer can be changed by heat treatment to give improved strenght.

The nickel layer may have a phosphorus content in the range between 2 and 15%.

The thickness of the layer is preferably very small, being for example less than 20 microns.

Phosphate treatment can be applied on the outside of the nickel layer.

What is claimed is:

1. A hub for a predamper of a damping device having loose coupling means (60), especially for a motor vehicle, comprising two distinct and concentric coaxial parts (43, 48) namely externally an external flange (43) having a denture consisting of teeth (44) and recesses (45) of the loose coupling means (60) and internally an internal piece (48) being longer than the external flange (43) and internal rotary coupling splines (40) for coupling the hub (30) in rotation with a shaft, characterized in that the internal piece is an internal sleeve (48) having the internal rotary coupling splines (40), in that the flange (43) has a tubular form (49)

at its inner periphery said tubular inner periphery (49) of the external flange (43) has a greater axial length than the remainder of the external sleeve (43), to define shoulders (71, 72) in the region of said denture (44, 45), and in that the inner periphery (49) of the external flange (43) is fitted around the outer periphery of the internal sleeve (48), with axial stop means being interposed for preventing any axial sliding movement of the external flange (43) with respect to the internal sleeve (48).

2. A hub according to claim 1, characterised in that the axial stop means constitute means for preventing rotation of the external flange (43) with respect to the internal sleeve (48).

3. A hub according to claim 1, characterised in that the axial stop means comprise a force-fitted connection.

4. A hub according to claim 2, characterised in that the axial stop means consist of a weld.

5. A hub according to claim 2, characterised in that the stop means consist of an adhesive bond.

6. A hub according to claim 1, characterised in that the axial stop means consist of a superimposed moulding.

7. A hub according to claim 1, characterized in that the internal sleeve (48) constitutes an adaptor member of variable thickness, while the external flange (43) cooperatively engages a predamper.

8. A hub according to claim 7, characterised in that the internal sleeve (48) is of constant length.

9. A hub according to claim 1, characterized in that a second plate of the predamper is mounted and secured to the tubular inner periphery (49) of the external flange (43).

10. A hub according to claim 1, characterised in that the external flange (43) includes notches (46) for receiving circumferentially acting resilient means of low stiffness.

11. A torsion damping device comprising a damper plate (4) surrounding a hub (3), with loose coupling means (60) interposed between the inner periphery of the damper plate (4) and the outer periphery of the hub (3), characterised in that it includes a hub (3) according to claim 1.

12. A torsion damping device comprising:
    a damping plate;
    a hub having two distinct coaxial parts including an external flange;
        an internal sleeve having internal coupling splines for coupling with a shaft, said internal sleeve having an outer periphery fitted within an inner periphery of said external flange; and
    axial stop means for preventing axial sliding movement of the external flange relative to said internal sleeve;
    wherein said hub is disposed within said damping plate, said external flange having an outer periphery being within an inner periphery of said damping plate; and
    wherein said external flange has a denture comprising teeth and recesses, said external flange being axially shorter than said internal sleeve, said external flange having a tubular inner periphery having a greater axial length than a remaining outermost portion to define lateral shoulders.

13. The torsion damping member according to claim 12, wherein said internal sleeve may be one of a varying thickness to define an adapter member and said external flange cooperatingly engages a damping plate, said internal sleeve and said external flange together thereby accommodate a variably dimensioned connection between said damping plate and a shaft.

14. The torsion damping device according to claim 12, further comprising:
    a loose coupling means interposed between said hub and said dampling plate.

15. The hub according to claim 1, wherein said internal sleeve may be one of a varying thickness to define an adapter member and said external flange cooperatingly engages a damping plate, said internal sleeve and said external flange together thereby accommodate a connection between said damping plate and shafts of variable dimensions.

16. A hub according to claim 10, wherein the tubular inner periphery (49) of the flange (43) defines a base of the notches (46).

* * * * *